United States Patent Office 3,411,997
Patented Nov. 19, 1968

3,411,997
ELECTROLYTIC PROCESS FOR PREPARING N-LOWER ACYLOXYMETHYL-N-HYDROCARBYL LOWER ACYLAMIDES AND CERTAIN DERIVATIVES THEREOF
Sidney D. Ross, Williamstown, Manuel Finkelstein, North Adams, and Raymond C. Petersen, Williamstown, Mass., assignors to Sprague Electric Company, North Adams, Mass., a corporation of Massachusetts
No Drawing. Filed July 1, 1965, Ser. No. 468,981
9 Claims. (Cl. 204—59)

ABSTRACT OF THE DISCLOSURE

Electrolyzing an electrolyte composition so as to form an N-lower acyloxymethyl-N-hydrocarbyl lower acylamide. Preparation of this class of compounds permits the formation of certain derivatives by reacting this lower acylamide with compounds such as a carboxylic acid, a primary or secondary alcohol or mercaptan, a compound having an aromatic ring containing an unsubstituted nucleophilic position or an acid salt of a urea or thiourea.

---

The present invention is concerned with N-lower acyloxymethyl-N-hydrocarbyl lower acylamides, and particularly to such ester-amides in which the lower acyls are formyls.

Among the objects of the present invention is the provision of novel preparations and uses for the foregoing chemicals, as well as a novel chemical.

The above as well as additional objects of the present invention will be more fully set out in the following description of several of its exemplifications.

It has been discovered that N-lower acyloxymethyl-N-hydrocarbyl lower acylamides are readily prepared by electrolyzing a solution of an electrolyte in a liquid mixture of a lower alkanoic acid and an N-methyl-N-hydrocarbyl lower acylamide, with the electrolyzing resulting in the substitution of acyloxy for a hydrogen in the methyl group.

The preferred product of the present invention is N-formyloxymethyl-N-methylformamide, but the above-mentioned preparation can be used to make the designated compounds in which each lower acyl group has from one to about four carbons, that is can range from formyl to about butyryl. These compounds can be used as solvents, particularly for electrolytic capacitor electrolytes, and as intermediates for the preparation of related compounds. They will, for example, exchange acyl groups in the acyloxy portion of the molecule with the acyl groups of other acids; undergo a replacement of these acyloxy groups by ether groups or thioether groups by reaction with an alcohol or mercaptan; a replacement by aromatic groups by reaction with a compound having an aromatic ring containing an unsubstituted nucleophilic position; or the acyloxy groups can be converted to uronium or thiouronium groups by reaction with a urea or thiourea. Some of these reactions require, and some are facilitated by, the presence of catalysts such as a strong mineral acid.

The electrolytic preparation of the present invention is illustrated by the following examples:

EXAMPLE I

Five grams of sodium formate are dissolved in a mixture of 200 milliliters of redistilled dimethylformamide and 400 milliliters of 98–100% formic acid. The solution is placed in a water-jacketed one-liter beaker fitted with a magnetic stirring bar, a thermometer and a Teflon cover that carries two platinum sheet electrodes each 0.025 cm. thick and 2.5 cm. wide, and held parallel to each other at a separation of 2 cm. The cover is placed over the beaker so that 7 cm. of each electrode dips into the solution.

At a potential of 43 volts, a direct current of 4 amperes can be passed between the electrodes and through the solution, and cooling can be used to keep the solution temperature between 25 and 45° C. With such operation, reaction takes place rapidly. After the passage of 5.5 Faradays of charge, the solution is removed from the electrolysis cell, volatiles are distilled off at 80° C. under water pump vacuum, and diethyl ether added to the residue to precipitate out salt. This addition of ether can be repeated, each addition being followed by filtration as needed, and the diethyl ether then distilled off from the filtrate. The residue gives more than a 60% yield of N-formyloxymethyl-N-methylformamide which can be distilled at 59 to 65° C. at 0.07 to 0.15 millimeter of mercury. Upon redistillation this product boils at 50–53° C. under 0.035 millimeter of mercury, and has an $n_D^{24.5}$ of 1.4460. It is a clear, colorless, odorless liquid of low freezing-point with an infrared spectrum having strong absorptions at 5.83 and 5.97μ, and an elemental analysis showing its empirical formula to be $C_4H_7O_3N$. Its structural formula is:

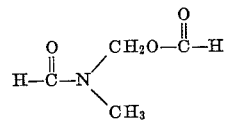

and it reacts with beta naphthol dissolved in ethanol containing concentrated HCl to form, at reflux temperatures, methyl-(2-hydroxynaphthylmethyl)-amine hydrochloride, which is a known compound.

The pot residue when the desired product is first distilled over, contains a further amount of the product which can be recovered by a further addition of diethyl ether, filtration, removal of the ether, and further distillation. The above-mentioned pot residue also contains some 2,6-diformyl-2,6-diaza-4-aza-heptane, a crystalline material which melts at 60 to 62° C. and which can be readily recovered by recrystallizing that residue from a half-and-half mixture of ethyl acetate and diethyl ether.

EXAMPLE II

A solution of 5 grams of potassium acetate in 28.1 grams of dimethylacetamide and 31.5 grams of glacial acetic acid is electrolyzed in a manner similar to that shown in Example I but at an anodic current density of 0.4 ampere per square centimeter. After each 3 ampere-hours of electrolyzing, 2 milliliters of glacial acetic acid are added, and the electrolyzing can be extended to 12.8 ampere-hours. Treatment of the reaction mixture as in Example I produces over 20% yield of redistilled N-acetoxymethyl-N-methylacetamide that boils at 51–56° C. under 0.005 to 0.02 millimeters of mercury and is a clear colorless liquid having an $n_D^{24}$ of 1.4557.

EXAMPLE III

A solution of 5 grams of potassium acetate in a mixture of 28.34 grams of dimethylformamide and 24.5 grams of acetic acid was anodically treated in the manner described in Examples I and II but with a current density of 0.4 ampere per square centimeter for a total of 12.6 ampere-hours. After the fourth and eighth ampere-hours, 12.5 milliliters of glacial acetic acid are added to the mixture without interrupting the electrolysis. Work-up, as in the previous examples, gave over 7% of redistilled N-acetoxymethyl-N-methylformamide boiling at 53–55° C. under 0.007 to 0.012 millimeters of mercury and having an $n_D^{24.5}$ of 1.4393.

The products of Examples II and III react with beta naphthol in concentrated HCl to form the same methyl-(2-hydroxynaphthyl methyl) amine hydrochloride produced by the product of Example I.

Electrolysis comparable to the foregoing will effect similar reactions with N-methylamides in which the acyl groups have as many as four carbons. Small amounts of water present in the mixture to be electrolyzed are readily tolerated but if the water content rises over about 5% the yields are materially diminished. Some hydroxymethyl methyl acylamide is also formed in significant quantities under these conditions, and it is accordingly preferred to start with an anhydrous reaction mixture. Product formation can be detected with anodic current densities as little as 0.0008 ampere per square centimeter using parallel electrode sheets, but the rate of product formation is then extremely slow. Current densities of 2 or more amperes per square centimeter are also suitable for the electrolysis but the heat evolution with this type of operation is relatively large and efficient cooling would ordinarily be required if such high current density is to be maintained for any length of time. Preferred current densities with parallel sheet electrodes are from about 1/10 to 1 ampere per square centimeter.

It is not necessary to have either of the electrodes in the shape of a flat sheet or plate. Rods are just as effective, although in some relationships the current densities would vary over the surface of an anode rod. It is possible to use a semipermeable diaphragm between the anode and cathode electrodes to keep the anolyte from mixing with the catholyte, but such a technique is not needed inasmuch as the current efficiency without the diaphragm is ample.

The salts added to the mixture being electrolyzed essentially increase its electrical conductivity and a wide range of salts can be used for this purpose. Salts of a lower alkali metal such as lithium, sodium and potassium, are preferred but salts of other acids are also suitable. For instance, lithium chloride can replace the salt of Example II with substantially no difference in the results. In general, sufficient salt should be added to impart to the mixture a conductivity of greater than $10^{-8}$ mho$^{-1}$–centimeters$^{-1}$.

The electrolyzing temperature can be as low as the freezing point of the solution or as high as its boiling point without greatly affecting the electrolyzing action. Lower temperatures are generally more difficult to maintain, particularly when high current densities are used, and the higher temperatures are accordingly preferred. However, the alkanoic acid present in the mixture can be fairly volatile so that when using temperatures within about 30° C. of the boiling points of these acids it is advisable to completely enclose the electrolyzing compartment and also to provide a reflux condenser of superatmospheric pressure to keep from losing significant quantities of such acid. Alternatively-make-up amounts of such acid can be periodically added to the mixture being electrolyzed. When the alkanoic acid has two or more carbon atoms it also tends to be gradually destroyed during the electrolysis so that make-up quantities can be added as indicated in Examples II and III even when such electrolysis takes place at about room temperature.

The proportion of alkanoic acid to acylamide is subject to wide variation. When the concentration of alkanoic acid is over about 20 times that of the acylamide, the efficiency of the current in producing the desired product is greatly reduced although such product can be formed even when the alkanoic acid concentration is as high as 98%. Conversely the acylamide concentration can be as high as 20 times that of the alkanoic acid without seriously reducing the current efficiency, although at such high concentrations the conductivity of the mixture may be quite low so that only a low current density can be used and the product formation takes place at a low rate.

The mixture being electrolyzed can also contain other ingredients such as diethyl ether, tetrahydrofurane and paraffin hydrocarbons, or any other material that does not interfere with the desired reaction. These supplemental materials are preferably kept down to not over 10% in concentration.

Using the above-described electrolytic procedure there can be prepared compounds having the following formula:

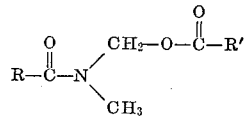

where R and R' can be H, $CH_3$, $C_2H_5$, $C_3H_7$ (either normal or iso), etc. The acyloxylated methyl group can have either or both of its hydrogens substituted by hydrocarbyl groups, and the unacylated methyl connected to the nitrogen can be replaced by other hydrocarbyl groups such as ethyl, propyl, phenyl, para-tolyl, cyclohexyl, cyclohexenyl, cyclopentenyl, and can even be part of a group that also forms the acyl that is connected to the nitrogen. By way of example, N-methyl-pyrrolidone can be substituted for the dimethylformamide in Example I and the process of that example will then produce N-formyloxymethyl pyrrolidone.

The foregoing acyloxylated products are very useful as solvents. Inasmuch as they are both esters and amides they have a particularly strong and diversified solvent action. They can, for example, be used as solvents for the electrolytes of electrolytic capacitors. Any of the usual solutes such as borates, phosphates, picrates and stable salts of hydroxy carboxylates, can be dissolved in these solvents at concentrations from about 1 to about 15% by weight and will provide very effective operation. Aluminum or tantalum foils, wire, or sintered porous pellets make desirable anode materials for use with such electrolytes and they can also be formed with an oxide coating by a preliminary anodizing in the same electrolytes.

The N-formyloxymethyl-N-methyl-formamide is the preferred solvent for electrolytic capacitor electrolytes. This solvent has an unusually high degree of solvency as well as an exceedingly low freezing point, very low volatility and low viscosity. Aside from these advantages, it behaves essentially like dimethylformamide itself. This is illustrated by:

EXAMPLE IV

In 10 milliliters of N-formyloxymethyl-N-methyl-formamide were dissolved half a gram of tris-(triethyl ammonium)-trimethyl-tetraphosphate described in U.S. Patent 2,934,682 granted Apr. 26, 1960, and in this solution was immersed a 2 centimeter by 2 centimeter piece of tantalum foil 5 mils thick. This foil was connected as an anode and a platinum wire also immersed in the same solution as a cathode, and an 8 milliampere direct current was passed between the electrodes through the solution, the voltage being increased as much as possible while the current was not permitted to increase beyond that level. After six minutes the potential reached 194 volts and the tantalum was filmed by an oxide coating. The anode was then aged by applying a 200 volt potential between the electrodes. The current passed was initially 8 milliamperes, but over a period of four minutes dropped to 0.51 milliamperes. Another voltage-increase step was then applied, the voltage starting at 240 and in four minutes reaching 359 with the current held to not over 8 milliamperes. A final aging at 360 volts brought the current down to 0.49 milliamperes in four minutes, producing a good workable capacitor.

Similar results are also obtained with a 6% solution of ammonium acid tartrate in the N-formyloxymethyl-N-methyl-formamide. A little dimethylformamide, up to about 25%, can also be present in the electrolyte and this kind of a solvent mixture is desirable because it is directly formed in the crude electrolyzed mixture and can be recovered without distilling the product over. It is only necessary to distill off any residual acid and remove the salt originally added to increase conductivity. To simplify the preparation of the capacitor electrolyte, the preferred salt, added to the mixture electrolyzed for the purpose of formyloxylating the dimethylformamide, is sodium formate which is an excellent solute for capacitor electrolytes, so that it does not have to be removed from the final mixture. Other common prior art ionogens may be employed in place of the sodium formate, the ammonium acid tartrate or the complex phosphate of Example IV. For example, boric acid, phosphoric acid, a stable hydroxy carboxylic acid, amine salts, etc. may also be employed.

The N-lower-acyloxymethyl-N-hydrocarbyl lower acylamides produced by the process of the present invention are also useful as intermediates in the preparation of related compounds. They readily exchange the acyl portions of their acyloxy groups for acyl groups of other acids such as benzoic acid and other alkanoic acids. This is illustrated by the following examples:

EXAMPLE V

Three drops of aqueous concentrated hydrochloric acid (specific gravity 1.19) were added to a solution of N-formyloxy-methyl-N-methylformamide (11.7 g.) in propionic acid (100 ml.), and the solution was left standing overnight at room temperature. Most of the excess propionic acid was removed with the water pump, keeping the bath temperature below 75° C. The remaining mixture was dissolved in diethyl ether (200 ml.), and the solution was stirred with sodium carbonate (25 g.) and filtered. The ether was removed, and the residue was distilled at 0.02 mm. of mercury, yielding 11.7 g. (80.7%) of N - propionoxymethyl - N - methylformamide; boiling point—55–57° C., $n_D^{24}$—1.4420. A sample redistilled for analysis had a boiling point of 50–51° C. at 0.01 mm. of mercury and an $n_D^{25}$ of 1.4412.

Elemental analysis calculated for $C_6H_{11}NO_3$: C, 49.65; H, 7.64; N, 9.65. Found: C, 49.65; H, 7.72; N, 9.55.

EXAMPLE VI

To a solution of benzoic acid (60 g.) in distilled dimethylformamide (100 ml.) was added N-formyloxymethyl-N-methylformamide (11.7 g.) and aqueous concentrated hydrochloric acid (10 drops, specific gravity 1.19). The solution was left standing overnight at room temperature and then dissolved in diethylether (500 ml.). The ether solution was stirred magnetically with sodium carbonate (53 g.) in water (300 ml.). Additional ether and water were added periodically to facilitate the neutrilization of the acid. The organic layer was separated, washed with sodium carbonate solution and dried over magnesium sulfate. The ether was distilled off through a Vigreux column to leave 8 g. (41%) of crude N-benzoyloxymethyl-N-methylformamide which can be distilled under 0.02 millimeter of mercury at 111 to 123° C. to give a pure material, $n_D^{24}$—1.5326, with an infrared spectrum identical to that for N-benzoyloxymethyl-N-methylformamide prepared by decomposing benzoyl peroxide in dimethylformamide.

While the foregoing acyl group interchanges proceed very smoothly and readily with added strong mineral acid as catalyst, they will in many instances go just as effectively although more slowly without such catalyst. Where the acyl group of the displacing acid has a higher boiling point than the acid corresponding to the acyl group displaced, the displacement can be made to go essentially to completion by a heating operation that takes the reaction mixture above the temperature at which the lower boiling acid boils off.

The N-lower acyloxymethyl-N-hydrocarbyl lower acylamides also undergo a substitution reaction with primary or secondary alcohols or primary or secondary mercaptans, but this reaction does not occur appreciably until a catalytic quantity of strong mineral acid is present.

These reactions permit the facile preparation of N-alkoxymethyl- and N-alkylthiomethyl-N-methylformamides. Neither class of compounds was previously known, and these reactions make it possible to systematically vary some of the properties of dimethylformamide which are critical in its utility as a electrolyte solvent. By varying the nature of the R group in

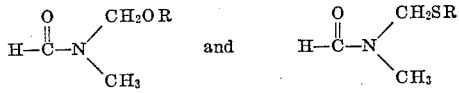

it is possible to obtain electrolyte solvents of higher boiling point or lower freezing point or greater fluidity than dimethylformamide itself. The availability of these reactions and of these two new classes of compounds thus makes it possible to tailor electrolyte solvents with very specific properties for critical applications.

It should be clear that these reactions are not limited to the preparation of N-alkoxymethyl-N-methylformamides and would proceed equally well with the more general structures

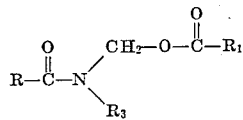

to give

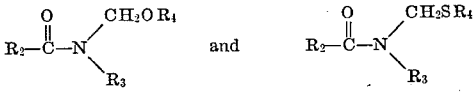

where $R_1$, $R_2$, $R_3$ and $R_4$ are hydrocarbyl groups.

The term hydrocarbyl groups is understood to include alkyl, alkylene, acetylene, terpenes, aryl and substituted aryl groups.

EXAMPLE VII

Aqueous concentrated hydrochloric acid (3 drops, specific gravity 1.19) was added to a solution of N-formyloxymethyl-N-methylformamide (5.85 g.) in ethanol (50 ml.). After 1.5 hours vapor phase chromatography showed that the N-formyloxymethyl-N-methylformamide was completely consumed. The solution was then dissolved in diethyl ether (250 ml.), the ether solution was stirred with an excess of sodium carbonate for several hours, and then filtered. After filtration the ether was distilled off through a Vigreux column, and the residue was distilled at 0.04 mm. of mercury to give 4 g. (68%) of N-ethoxymethyl-N-methylformamide; boiling point of 33–36° C., $n_D^{24.5}$—1.4319. Redistillation for analysis gave a middle cut boiling at 26° C., under 0.012 mm. of mercury; $n_D^{24.5}$—1.4317.

The procedure of Example VII permits the general preparation of alkoxymethyl-N-methylformamides. Some representative examples of this preparation with yields, properties and analyses are given in the table which follows:

TABLE I
N-Alkoxymethyl-N-methylformamides

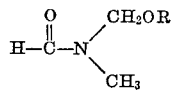

| R | B.P., °C. | P, mm. | $n_D$ | Yield, percent | Analysis Calcd. | | | Analysis Found | | |
|---|---|---|---|---|---|---|---|---|---|---|
| | | | | | C | H | N | C | H | N |
| $CH_3$— | 57–60 | 8 | 1.4234 at 24.5° | 83.5 | 46.59 | 8.80 | 13.58 | 46.71 | 8.54 | 13.35 |
| $CH_3CH_2$— | 26 | 0.012 | 1.4317 at 24.5° | 68 | 51.26 | 9.46 | 11.96 | 51.70 | 9.59 | 11.98 |
| $(CH_3)_2CH$— | 31 | 0.05 | 1.4306 at 24.5° | 77 | 54.94 | 9.99 | 10.68 | 54.94 | 9.72 | 10.69 |
| Cyclohexyl— | 66–67 | 0.01 | 1.4720 at 24° | 87.7 | 63.13 | 10.01 | 8.18 | 62.85 | 9.61 | 7.92 |
| $CH_3OCH_2CH_2$— | 55–56 | 0.01 | 1.4440 at 24° | 79.6 | 48.97 | 8.90 | 9.52 | 49.12 | 8.82 | 9.33 |

EXAMPLE VIII

A two-phase mixture of N-formyloxymethyl-N-methylformamide (11.7 g.) and n-amylmercaptan (50 ml.) was treated with aqueous concentrated hydrochloric acid (5 drops, specific gravity 1.20). Heat was evolved, and a single phase resulted. Vapor phase chromatographic analysis indicated that all the N-formyloxymethyl-N-methylformamide had reacted within 0.5 hour. The reaction mixture was dissolved in diethyl ether, and the solution was stirred several hours with sodium carbonate (43 g.). The resulting solution was filtered, and the ether distilled off through a Vigreux column. The excess mercaptan was then also distilled off with an aspirator, and the residue was distilled over at 0.05 mm. to give 16.2 g. (92.6%) of crude N-n-amylthiomethyl-N-methylformamide boiling point 66–71° C., $n_D^{25}$—1.4883.

Elemental analysis calculated for $C_8H_{17}NOS$: C, 54.81; H, 9.78; N, 7.99; S, 18.29. Found: C, 54.83; H, 9.97; N, 7.70; S, 18.47.

With a compound that has an aromatic ring containing an unsubstituted nucleophilic position, the N-lower acyloxymethyl-N-hydrocarbyl lower acylamides react to form N-arylmethyl-N-hydrocarbyl lower acylamides. This is shown in the following examples:

EXAMPLE IX

N-formyloxymethyl-N-methylformamide (11.7 g.) and aqueous concentrated sulfuric acid (10 drops, 96%) were added to a solution of beta naphthol (14.4 g.) in dimethylformamide (75 ml.). After standing twenty-two hours the reaction mixture was dissolved in a large volume of diethyl ether, and the ether solution was stirred one hour with solid sodium bicarbonate. The solid was filtered off, and the filtrate was concentrated from a water bath with the aspirator. An orange colored solid residue remained and was dissolved in hot ethyl acetate and allowed to crystallize. After filtration hexane was added to the mother liquor, and another crop of crystals was obtained to give a total yield of 17.6 g. (82%) of N-methyl-N-(2-hydroxynaphthylmethyl) formamide, melting point 158–160° C. Recrystallization from ethyl acetate raised the melting point to 159–161° C.

Elemental analysis calculated for $C_{13}H_{13}NO_2$: C, 72.54; H, 6.09; N, 6.51. Found: C, 72.37; H, 5.96; N, 6.35.

EXAMPLE X

Aqueous concentrated sulfuric acid (0.75 ml., 96%) was added to a solution of N-formyloxymethyl-N-methylformamide (11.7 g.) in anisole (75 ml.). A turbidity appeared on shaking, but this disappeared with time. Vapor phase chromatographic analysis after fifteen hours showed a small amount of unreacted N-formyloxymethyl-N-methylformamide. More of the sulfuric acid (5 drops) was added, and the solution was again left standing overnight. The resulting solution was diluted with diethyl ether, washed three times with water, two times with saturated sodium bicarbonate solution and again with water, and then dried over magnesium sulfate. The solvent and excess reagents were removed with the water pump, and the residue was distilled in vacuo to give 12.3 g. (68.7%) of N-methyl-N-p-methoxybenzylformamide; boiling point, 100–115° C. at 0.01–0.02 mm. of mercury, $n_D^{24}$—1.5424. A sample resdistilled for analysis boiled at 103–105° C. under 0.01 mm. of mercury and had an $n_D^{24.5}$ of 1.5421.

Elemental analysis calculated for $C_{10}H_{13}NO_2$: C, 67.02; H, 7.31; N, 7.82. Found: C, 66.72; H, 7.85; N, 7.75.

EXAMPLE XI

Aqueous concentrated hydrochloric acid (3 drops, specific gravity 1.17) was added to a solution of N-formyloxymethyl-N-methylformamide (11.7 g.) in molten phenol (50 g.). After standing overnight the mixture was dissolved in diethyl ether, and the ether solution was washed with saturated sodium bicarbonate until no further effervescence was observable. The ether was then removed with the water pump, and the remainder distilled at 0.08 mm. of mercury with the heating bath at 135° C. until phenol no longer distilled. The thick residue, 14.9 g. (90.3%) was fractionally crystallized first from ethyl acetate and then from a 50:50 ethyl acetate-hexane mixture. Ultimately 4 g. of N-methyl-N-p-hydroxybenzylformamide, melting point 135–137° C., was obtained as the less soluble material. The more soluble material, N-methyl-N-o-hydroxybenzylformamide, had a melting point of 85–88° C. after crystallization from the ethyl acetate-hexane mixture.

Elemental analysis calculated for $C_9H_{11}NO_2$: C, 65.44; H, 6.71; N, 8.48. Found for N-methyl-N-p-hydroxybenzly-formamide: C, 65.60; H, 7.01; H, 8.30. Found for N-methyl-N-o-hydroxybenzylformamide: C, 65.37; H, 6.82; N, 8.38.

The following example illustrates the reaction of the N-lower acyloxy-methyl-N-hydrocarbyl lower acylamides with ureas or thioureas:

EXAMPLE XII

N-formyloxymethyl-N-methylformamide was added to thiourea hydrochloride (6 g.) in dimethylformamide (100 ml.). On standing crystals precipitated, and within a few hours the reaction is complete. Crude N-formyl-N-methyl-aminomethylisothiouronium chloride, 8.0 g. (87%) was filtered off (melting point 117–121° C.) and was crystallized three times from a mixture of equal volumes of methanol and ether, for analysis. So purified its melting point was 127–128° C.

Elemental analysis calculated for $C_4H_{10}ClN_3OS$: C, 26.16; H, 5.49; N, 22.88; S, 17.46. Found: C, 26.34; H, 5.99; N, 22.57; S, 17.42.

Reactions similar to that of Example XII take place with ureas and thioureas which are unsubstituted or which have one, two, three or four substituents of the hydrocarbyl or ether type.

In all of the foregoing work any strong mineral acid, even phosphoric acid or nitric acid, can be used as the catalyst in place of the hydrochloric acid or sulfuric acid shown. At least one of the reactants should be in the liquid phase in order to permit the reaction to take place. The reaction can accordingly be carried out with at least one of the reactants either in solution or molten. As in Example VIII it is not necessary for both reactants to be in the same phase.

Obviously many modifications and variations of the present invention are possible in the light of the above teachings. It is, therefore, to be understood that within the scope of the appended claims the invention may be practiced otherwise than as specifically described.

What is claimed is:

1. A method which comprises electrolyzing an electrolyte comprising a conducting solute, a lower alkanoic acid and an N-methyl-N-hydrocarbyl lower acylamide (I), the electrolysis resulting in the substitution of an acyloxy group for a hydrogen on the methyl group of said acylamide (I) to form an N-lower acyloxy methyl-N-hydrocarbyl lower acylamide (II).

2. The method of claim 1 in which the solute is an alkali metal salt of the alkanoic acid.

3. The method of claim 1 in which the alkanoic acid is formic acid and said lower acylamide (I) is N-methyl-N-hydrocarbyl formamide.

4. The method of claim 1 including contacting said N-lower acyloxymethyl-N-hydrocarbyl lower acylamide (II) with a carboxylic acid having an acyloxy group different from that of the acyloxy portion of said acylamide (II), while at least one of these reactants is in liquid condition, for a period long enough to cause the acyloxy portion of the acid to take the place of the acyloxy group in said acylamide (II).

5. The method of claim 4 in which the conducting solute is an alkali metal salt of the alkanoic acid and wherein a catalytic quantity of strong mineral acid is present when said acylamide (II) is contacted with said carboxylic acid.

6. The method of claim 1 including contacting said N-lower acyloxymethyl-N-hydrocarbyl lower acylamide (II) with a primary or secondary alcohol or mercaptan while at least one of the contacting reactants is in liquid condition and in the presence of a catalytic quantity of a strong mineral acid, until the alcohol or mercaptan reacts to form an N-alkoxymethyl or an N-alkylthiomethyl-N-hydrocarbyl lower acylamide.

7. The process of claim 1 including contacting said N-lower acyloxymethyl-N-hydrocarbyl lower acylamide (II) with a compound having an aromatic ring containing an unsubstituted nucleophilic position while at least one of these materials is in liquid condition, and the contacting is in the presence of a catalytic quantity of a strong mineral acid until said compound displaces the acyloxy portion of said acyloxyamide (II) to form an N-arylmethyl-N-hydrocarbyl lower acylamide.

8. The method of claim 1 including contacting said N-lower acyloxymethyl-N-hydrocarbyl lower acylamide (II) with an acid salt of a urea or thiourea while at least one of the contacted materials is in liquid condition, until the acyloxy portion of the ester-amide is displaced by a uronium or thiouronium group corresponding to the urea or thiourea respectively.

9. The method which comprises anodically electrolyzing a solution of sodium or potassium formate in a substantially anhydrous mixture of formic acid and dimethylformamide to cause the formyl portion of the formic acid to take the place of a hydrogen on a methyl group of the dimethylformamide.

References Cited

UNITED STATES PATENTS 1,570,467    1/1926    Ewan _____ 204—59

HOWARD S. WILLIAMS, *Primary Examiner.*

H. M. FLOURNOY, *Assistant Examiner.*

UNITED STATES PATENT OFFICE
CERTIFICATE OF CORRECTION

Patent No. 3,411,997                  November 19, 1968

Sidney D. Ross et al.

It is certified that error appears in the above identified patent and that said Letters Patent are hereby corrected as shown below:

Columns 7 and 8, TABLE I, fourth column, line 1 thereof, "1.4234" should read -- 1.4324 --. Column 8, line 50, "H, 8.30" should read -- N, 8.30 --.

Signed and sealed this 10th day of March 1970.

(SEAL)
Attest:

Edward M. Fletcher, Jr.            WILLIAM E. SCHUYLER, JR.
Attesting Officer                    Commissioner of Patents